Oct. 5, 1954  J. BURKS  2,690,578
RECEPTACLE FOR SHOE SOLE DRESSING
Filed Jan. 3, 1950  2 Sheets-Sheet 1

INVENTOR.
JOSEPH BURKS
BY Jerome R. Cox
ATTORNEY

*INVENTOR.*
JOSEPH BURKS
BY
Jerome R. Cox
ATTORNEY

Patented Oct. 5, 1954

2,690,578

UNITED STATES PATENT OFFICE 2,690,578

RECEPTACLE FOR SHOE SOLE DRESSING

Joseph Burks, Columbus, Ohio

Application July 3, 1950, Serial No. 171,907

4 Claims. (Cl. 15—121.1)

The invention disclosed in this application relates in general to a receptacle and more especially to a receptacle or container for holding liquids such as shoe dressings.

The embodiment of my invention illustrated is designed especially for containing sole dressing in convenient condition so that it can be readily used. Normally such liquid is maintained either in small bottomed bottles which are subject to being overturned or in open pans which are subject to contamination through dirt falling into them or to splashing and other disasters. The ordinary large size receptacle is inadequate also because it requires so much of the dressing to insure sufficient depth that the dressing is conveniently usable.

One of the objects of my invention therefore is the provision of a new and useful receptacle or container.

A further more specific object of my invention is the provision of a receptacle of the character described having separate compartments for dressing of different colors and having openings through which access may be separately obtained to said separate compartments.

A further object of my invention is the provision of such a receptacle having sloping sides internally so as to provide easy access to and efficient control of the liquid.

A further object of my invention is the provision in such a receptacle of a scraping bar by which a brush used therewith may be easily cleaned.

A feature of my invention is the provision in connection with such a receptacle of an integral drip tray.

Further objects and features of my invention will be apparent from the following specification when considered in connection with the accompanying drawings illustrating an embodiment of my invention wherein:

Figure 1:
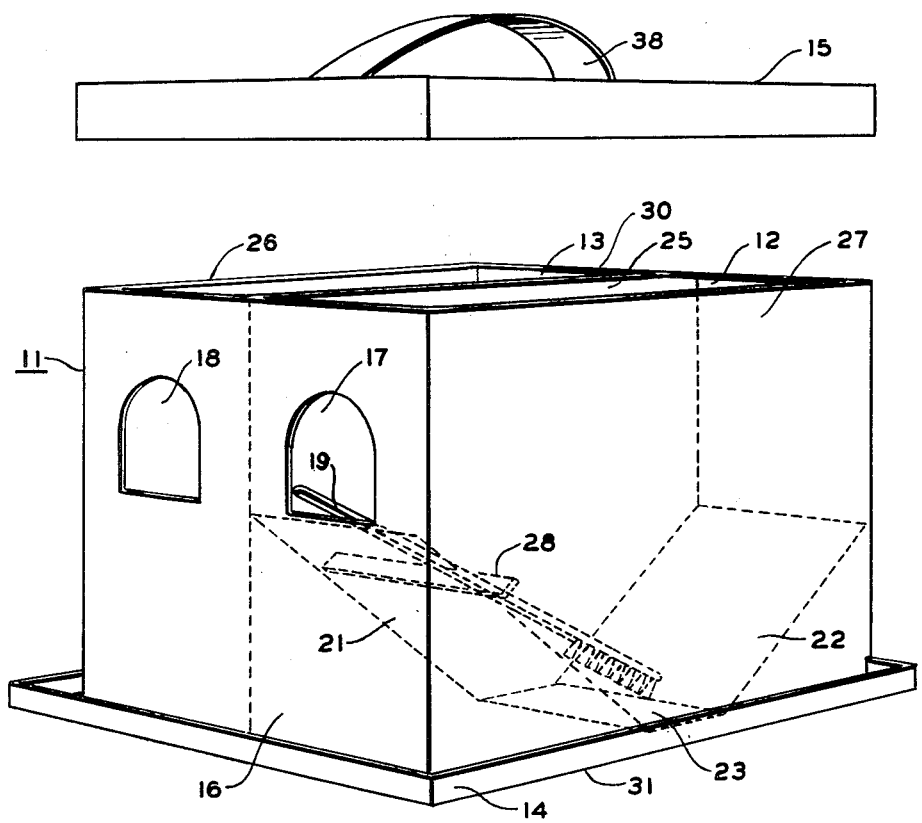
Fig. 1 is a view in perspective of a shoe dressing container having the top removed therefrom and shown spaced above the container.
Figure 2:
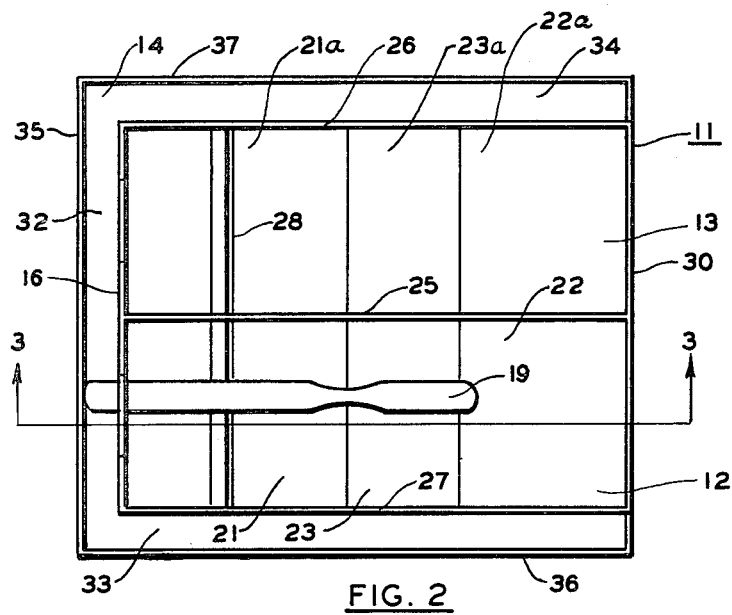
Fig. 2 is a top plan view of the container with the cover removed.

Referring in detail to the drawings it may be seen that I have shown a receptacle 11 having compartments 12 and 13, a drip tray 14, and a cover 15. The rectangular box is formed of sheet metal having a front wall 16, side walls 26 and 27, a rear wall 30 and a bottom 31. A partition 25 intermediate and parallel to the side walls 26 and 27 separates the compartments 12 and 13. The front 16 of the box 11 is formed with apertures 17 and 18 through which a brush such as brush 19 may be extended so as to become saturated with the liquid for the purpose of applying sole dressing to shoes. The compartment 12 is provided with sloping walls 21 and 22 (which are set in at an angle and soldered or otherwise secured to the bottom 31 and to the front 16 and rear 30 respectively) and with a horizontal bottom portion 23 which is actually a part of the bottom 31. Similarly the compartment 13 is formed with sloping portions 21a and 22a and with a horizontal portion 23a. Intermediate and separating the two compartments 12 and 13 is a partition 25. Extending through the partition 25 and soldered or otherwise secured to the side walls 26 and 27 is a scraping bar 28 which is positioned above the normal upper limit of the liquid and is provided so that excess liquid may be removed from the brush prior to taking the brush from the receptacle for the purpose of applying shoe dressing to shoes or otherwise.

Figure 3:
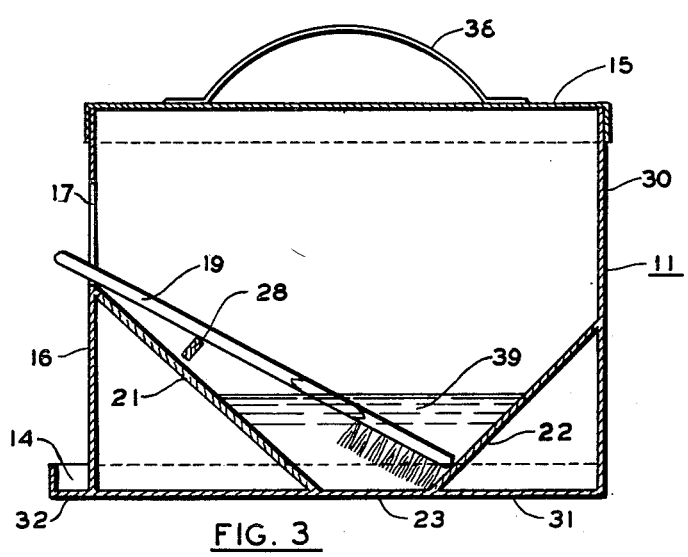
Fig. 3 is a vertical sectional view taken substantially on the line 3—3 of Fig. 2 and showing a supply of shoe dressing within one compartment of the container.

The bottom 31 is extended forwardly as at 32 and to each side as at 33 and 34 so as to provide a drip trap to prevent drippings of the shoe dressing from the brush from soiling the surroundings of the box. The extension 32 is turned up as at 35, extension 33 is turned up as at 36 and extension 34 is turned up as at 37 so as to complete the drip tray. The cover 15 is provided with a handle 38. As shown in Fig. 3, a shoe dressing liquid 39 is normally contained within the receptacle.

It is believed that the use of the above described receptacle will be obvious from its description. Different colors of sole dressing liquid are normally supplied—one color to the compartment 12 and another color to the compartment 13—as, for example, such as the liquid shown at 39 in the compartment 12. The box is conveniently transported as may be desired, the cover 15 providing a protection for preventing the splashing of the liquid from the box. When it is desired to use liquid in the box a brush such as brush 19 is inserted through the appropriate opening 17 or 18 and is saturated with liquid, a portion of which may be scraped off to the desired extent on the bar 28 as the brush is withdrawn and the liquid applied to the shoe.

I have shown and described the embodiment of my invention as made of sheet metal. I also propose to make embodiments of my invention of other materials. For instance, I will make embodiments of glass which will be attractive, will allow observers to see the liquid within the container and will be easily kept clean. Similarly, for instance, I will make embodiments of plastic (especially clear plastic) which will also be attractive, transparent, and easily kept clean and will in addition be easily formed by molding processes.

It is to be understood that the above described embodiment of my invention is for the purpose of illustration only and various changes may be made therein without departing from the spirit and scope of the invention.

I claim:

1. A receptacle comprising a box formed of four sheet metal vertical side walls secured to each other at adjacent edges, of a sheet metal horizontal bottom secured to said vertical side walls at adjacent edges of said side walls, of a sheet metal partition dividing said box into a pair of compartments and secured at its edges to said bottom and to a pair of said vertical side walls which are opposite to each other, of a pair of sloping plates in each compartment each secured at its edges to a pair of adjacent side walls, to said partition, and to said bottom, and of a scraper bar passing through said partition at a point vertically above one of said sloping plates and extending substantially horizontally to the opposed side walls and secured thereto, so that each compartment has four substantially vertical side walls formed by portions of said first named vertical side walls and of said partition and has a three part bottom including a sloping portion formed by one of the plates, a horizontal portion formed by a part of said bottom and another sloping portion formed by the other plate; one of the side walls to which one of said plates is secured being formed with an aperture through which access to said compartment may be obtained; the other three side walls being imperforate; and said bottom being extended outward beyond its juncture with a plurality of said vertical side walls and turned up adjacent to its periphery to provide a drip tray to eliminate possible drippings.

2. A receptacle for containing sole dressing and for use with a brush comprising a box having a plurality of compartments each of the compartments being formed with four substantially vertical side walls and with a bottom having a horizontal portion and having a pair of sloping plates leading from opposite side walls to the horizontal portion of the bottom, one of said opposite side walls being formed with an aperture through which access may be obtained to the said compartment, said sloping plates being joined to the opposite side walls at positions intermediate the tops and bottoms thereof and at a level below said aperture and being each joined to said bottom at positions intermediate the ends thereof and said compartments being provided with a substantially straight and substantially horizontally extending bar positioned adjacent to the sloping plate which is secured to the apertured side of the wall but spaced from said sloping plate and from said apertured side wall and secured to the side walls which are adjacent to said apertured side wall whereby excess sole dressing may be scraped from said brush.

3. A receptacle comprising a box formed of two sheet metal vertical side walls and two sheet metal vertical end walls secured to each other at adjacent edges; of a sheet metal horizontal bottom secured to said vertical side walls and to said vertical end walls at adjacent edges of said vertical side and end walls; of a sheet metal partition dividing said box into a pair of compartments and secured at its edges to said bottom and to said end vertical walls; of a pair of sloping plates positioned in each compartment and each secured at its edges to one end wall and to the adjacent side wall, to said partition and to said bottom; and of a scraper bar extending through said partition and secured at its ends to said vertical side walls at points vertically above one of said sloping plates, so that each compartment has two substantially vertical end walls, has two substantially vertical side walls formed by one of said first named vertical side walls and by said partition and has a three part bottom including a sloping portion formed by one of the plates, a horizontal portion formed by a part of said bottom, and another sloping portion formed by the other plate; the end wall secured to the sloping plate which is positioned under the scraper bar being formed with an aperture through which access to said compartment may be attained; the other end wall and the two side walls being imperforate; and said bottom being extended out beyond its juncture with said vertical side walls and with said apertured end wall and turned up adjacent to its periphery to provide a drip tray to eliminate possible drippings.

4. A receptacle for shoe sole dressing comprising a box formed of a sheet metal bottom; four sheet metal substantially vertical side walls, one of said side walls being formed with an aperture; a sloping plate secured to said apertured side wall below said aperture and above the bottom of said apertured side wall and extending at an angle to said apertured side wall and to said bottom plate and secured to said bottom plate along a line intermediate the ends thereof; and another sloping plate secured to the opposite side wall of said box intermediate the top and bottom thereof and extending at an angle to said opposite side wall and to said bottom and secured to said bottom at a position further from said apertured side wall than the juncture thereof with said first named sloping plate, said bottom plate being extended beyond the side walls for the purpose of catching drippings.

References Cited in the file of this patent

UNITED STATES PATENTS

| Number | Name | Date |
|---|---|---|
| 352,195 | Krag | Nov. 9, 1886 |
| 653,695 | Raff | July 17, 1900 |
| 1,000,810 | Holdsworth | Aug. 15, 1911 |
| 1,008,856 | Mosher | Nov. 14, 1911 |
| 1,392,189 | Makie | Sept. 27, 1921 |
| 1,390,000 | Stephens | Sept. 6, 1921 |
| 1,407,107 | Wellenborg | Feb. 21, 1922 |
| 1,895,435 | Ahrens | Jan. 31, 1933 |